United States Patent
Liu et al.

(10) Patent No.: US 10,911,606 B2
(45) Date of Patent: *Feb. 2, 2021

(54) DIGITAL IMAGE-PAPER REGISTRATION ERROR CORRECTION THROUGH IMAGE SHEAR

(71) Applicant: Xerox Corporation, Norwalk, CT (US)

(72) Inventors: Chu-heng Liu, Penfield, NY (US); Paul J. McConville, Webster, NY (US); Douglas K. Herrmann, Webster, NY (US); Jason Matthew LeFevre, Penfield, NY (US); Seemit Praharaj, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/583,610

(22) Filed: Sep. 26, 2019

(65) Prior Publication Data

US 2020/0021691 A1 Jan. 16, 2020

Related U.S. Application Data

(63) Continuation of application No. 15/948,626, filed on Apr. 9, 2018, now Pat. No. 10,477,034.

(51) Int. Cl.
| | |
|---|---|
| *G06F 15/00* | (2006.01) |
| *G06K 1/00* | (2006.01) |
| *H04N 1/60* | (2006.01) |
| *H04N 1/00* | (2006.01) |
| *B41J 11/00* | (2006.01) |

(52) U.S. Cl.
CPC ...... *H04N 1/00005* (2013.01); *B41J 11/0095* (2013.01); *H04N 1/00037* (2013.01); *H04N 1/0066* (2013.01); *H04N 1/00082* (2013.01); *H04N 1/00092* (2013.01)

(58) Field of Classification Search
CPC .......... H04N 1/00005; H04N 1/00037; H04N 1/00082; H04N 1/00092; H04N 1/0066; B41J 11/0095
USPC .................................................... 358/1.9, 1.1
See application file for complete search history.

(56) References Cited

U.S. PATENT DOCUMENTS

| | | |
|---|---|---|
| 2007/0040884 A1 | 2/2007 | Shoki |
| 2010/0061786 A1 | 3/2010 | Van Bortel et al. |
| 2016/0214323 A1* | 7/2016 | Mizes ............. H04N 1/40 |
| 2017/0368741 A1* | 12/2017 | Mandel ........... B29C 64/112 |

* cited by examiner

*Primary Examiner* — Douglas Q Tran

(57) ABSTRACT

A method, non-transitory computer readable medium and apparatus for applying an image shear to correct a digital image-paper registration error are disclosed. For example, the method, performed by a processor of a printing device, includes detecting an amount of skew of a paper traveling through a registration system of a printing device, determining that the amount of skew is greater than a predefined threshold, applying an image shear to a digital image that will be printed on the paper, and controlling a plurality of printheads of the printing device to print the digital image on the paper with the image shear that is applied.

18 Claims, 5 Drawing Sheets

DIGITAL IMAGE-PAPER REGISTRATION ERROR CORRECTION THROUGH IMAGE SHEAR

CROSS REFERENCE TO RELATED APPLICATIONS

This application is a continuation of U.S. patent application Ser. No. 15/948,626, filed Apr. 9, 2018, which was recently allowed, which is herein incorporated by reference in its entirety.

The present disclosure relates generally to registration errors in printing devices and, more particularly, to a method and apparatus for performing image shear to correct a digital image-paper registration error.

BACKGROUND

Printing devices can be used to print images on print media. The print media can be fed through the printing device along a transport path and imaging path to have the image printed. Along the transport path and the imaging path, there are certain locations where processing errors can occur that can cause a misalignment of the image relative to the print media.

For example, the printing devices can have a registration system. The registration system may be responsible for correctly feeding the print media to an imaging system such that the printed image is correctly aligned with the print media. As the size and weight of print media grows larger and larger, it can be more and more difficult for currently designed registration systems to handle the larger print media.

SUMMARY

According to aspects illustrated herein, there are provided a method, non-transitory computer readable medium and apparatus for applying an image shear to correct a digital image-paper registration error. One disclosed feature of the embodiments is a method, performed by a processor of a printing device, that detects an amount of skew of a paper traveling through a registration system of a printing device, determines that the amount of skew is greater than a predefined threshold, applies an image shear to a digital image that will be printed on the paper, and controls a plurality of printheads of the printing device to print the digital image on the paper with the image shear that is applied.

Another disclosed feature of the embodiments is a non-transitory computer-readable medium having stored thereon a plurality of instructions, the plurality of instructions including instructions which, when executed by a processor, cause the processor to perform operations that detect an amount of skew of a paper traveling through a registration system of a printing device, determine that the amount of skew is greater than a predefined threshold, apply an image shear to a digital image that will be printed on the paper, and controls a plurality of printheads of the printing device to print the digital image on the paper with the image shear that is applied.

Another disclosed feature of the embodiments is an apparatus comprising a processor and a computer-readable medium storing a plurality of instructions which, when executed by the processor, cause the processor to perform operations that detect an amount of skew of a paper traveling through a registration system of a printing device, determine that the amount of skew is greater than a predefined threshold, apply an image shear to a digital image that will be printed on the paper, and controls a plurality of printheads of the printing device to print the digital image on the paper with the image shear that is applied.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure is related to a method and apparatus to correct digital image-paper registration errors through image shear. As discussed above, printing devices can have a registration system. The registration system may be responsible for correctly feeding the print media to an imaging system such that the printed image is correctly aligned with the print media. As the size and weight of print media grows larger and larger, it can be more and more difficult for currently designed registration systems to handle the larger print media.

Some systems attempt to remove registration errors by mechanically moving the paper to be properly aligned to the image path. For example, the systems may rotate the print media to remove skew such that the printed image is aligned with the print media. In other words, alignment may be defined as the borders or edges of the printed image being parallel to the edges of the print media.

Mechanical solutions may have limits to the length or size of paper that can be properly handled. In addition, mechanical solutions may not be adequate in certain scenarios where the printing device may have to handle various different sized print media.

Embodiments of the present disclosure use an image shear to correct a digital image-paper registration error. In other words, rather than mechanically adjusting the print media, the present disclosure applies a digital solution to adjust the printed image on print media that may have been skewed when passing through the image path. In one embodiment, the digital solution of the present disclosure may be applied in addition to mechanical solutions to correct registration errors.

Figure 1:
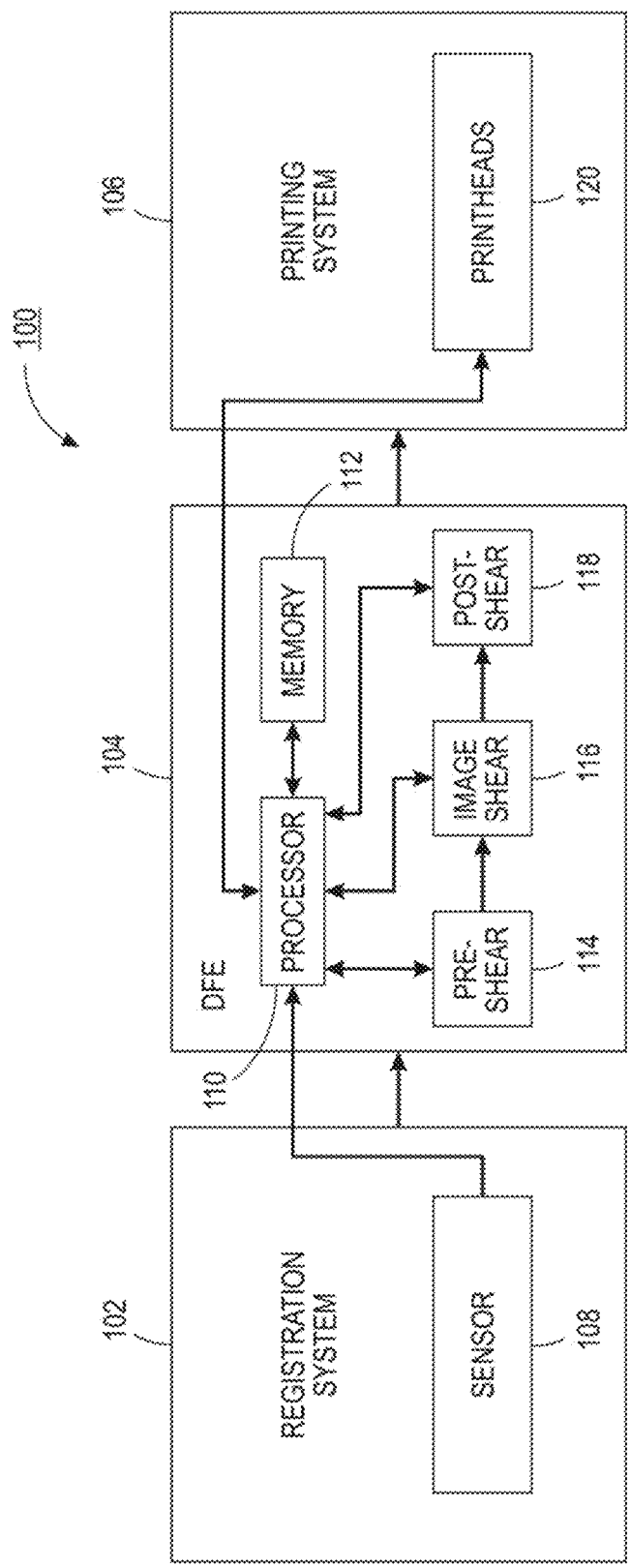
FIG. 1 illustrates a block diagram of example printing device of the present disclosure.

FIG. 1 illustrates a block diagram of an example printing device 100 of the present disclosure. The printing device 100 may be any type of printing device such as a multi-function device (MFD), a copy machine, laser printer, an ink jet printer, and the like.

In one embodiment, the printing device 100 may include a registration system 102, a digital front end (DFE) 104, and a printing system 106. It should be noted that the printing device 100 has been simplified for ease of explanation in FIG. 1 and may include additional components/systems that are not shown. For example, the printing device 100 may also include a feed tray, a finishing module, transport path components, a duplex return path, and the like.

In one embodiment, the registration system 102 may include at least one sensor 108. The sensor 108 may be a charged coupled device (CCD) sensor, a capacitive sensor, a video camera sensor, and the like. The sensor 108 may detect a position of a paper that enters the registration system 102 for printing. In one embodiment, the position may refer to an amount of skew of the paper. The amount of skew may be defined as an angle of misalignment relative to a process direction. When the paper is skewed, an image-paper registration error may occur during printing of a digital image.

Figure 2:
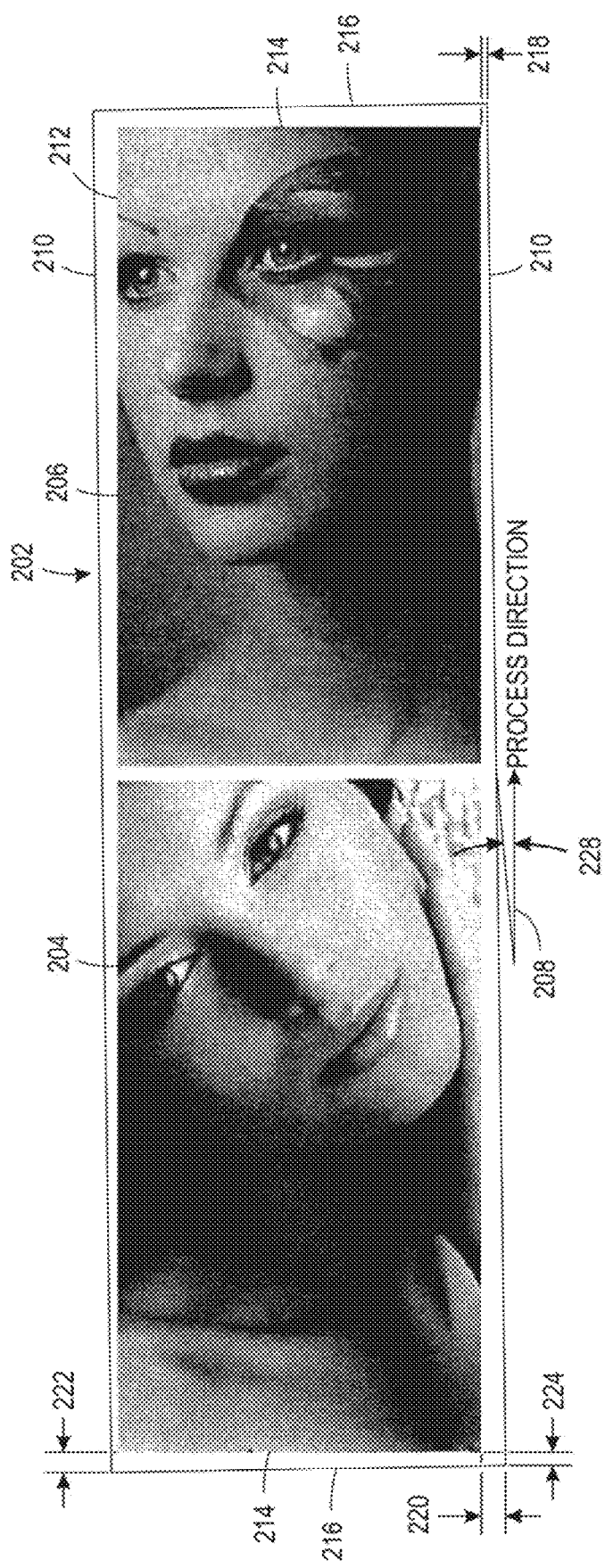
FIG. 2 illustrates an example of a digital image-paper registration error of the present disclosure.

FIG. 2 illustrates an example of the image-paper registration error. For example, a paper 202 may be skewed when leaving the registration system 102 towards the printing system 106 in a process direction 208. FIG. 2 illustrates a skew angle 228 that measures an amount of skew relative to the process direction 208. In one example, the skew angle 228 may be measured in milliradians.

In one embodiment, when the paper 202 is skewed, digital images 204 and 206 that are printed onto the paper 202 may be misaligned with the paper 202 creating the image-paper registration error. In some instances, the image-paper registration error may be unnoticeable. However, when the skew of the paper 202 is large enough the image-paper registration error may be noticeable.

For example, in FIG. 2, an edge 212 of the images 204 and 206 may not be parallel to an edge 210 of the paper 202. In addition, an edge 214 of the images 204 and 206 may not be parallel to an edge 216 of the paper 202. Said another way, a distance 218 between the edges 212 and 210 on the right hand side of the paper 202 may be less than a distance 220 between the edges 212 and 210 on the left hand side of the paper 202, or vice versa. In addition, a distance 222 between the edges 214 and 216 at the top of the paper 202 may be greater than a distance 224 between the edges 214 and 216 at the bottom of the paper 202, or vice versa.

As noted above, some printing devices attempt to correct the image-paper registration error via mechanical designs to control the alignment of the paper 202. However, the mechanical solutions may not be efficient or fast enough, or may be unable to correct the image-paper registration errors if the paper 202 is too large or long. However, the present disclosure applies a digital correction to the digital image 204 and/or 206 to correct the image-paper registration error using various modules in the DFE 104.

Referring back to FIG. 1, in one embodiment, the DFE 104 may include a processor 110, a memory 112, a pre-shear module 114, an image shear module 116, and a post-shear module 118. In one embodiment, the processor 110 may be coupled to the sensor 108, the memory 112, the pre-shear module 114, the image shear module 116, the post-shear module 118, and printheads 120 in the printing system 106.

The processor 110 may receive the amount of skew detected by the sensor 108. The processor 110 may the control operations of the pre-shear module 114, the image shear module 116, the post-shear module 118, and the printheads 120 to correct the image-paper registration error based on the amount of skew that was detected. The processor 110 may execute instructions stored in the memory 112. The memory 112 may also be used as a buffer to temporarily store pixel and scanline information during the image shear process, as discussed in further details below.

In one embodiment, the pre-shear module 114 may perform various pre-shear processes on the digital image (e.g., the digital images 204 and/or 206). The pre-shear module 114 may include different components or instructions executed by the processor 110 to perform operations such as edge growth, line width control, color correction, and the like. In other words, although the pre-shear module 114 is illustrated as a single block in FIG. 1, the pre-shear module 114 may be comprised of a plurality of different modules or components that each perform a different pre-shear process.

In one embodiment, the image shear module 114 may include instructions executed by the processor 110 to perform operations to apply image shear to the digital image. The image shear may be applied in the process direction, in a cross-process direction, or in both the process and the cross-process direction.

In one embodiment, image shear may include shifting of scanlines or blocks of pixels to gradually shift the digital image in a direction that compensates for the amount of skew in the paper. In other words, if the paper was skewed by 1.0 milliradians in the inboard direction, the image shear may attempt to shift the digital image gradually by 1.0 milliradians in the inboard direction such that the edges of the digital image and the paper are parallel or aligned.

In some instances, when the image shear is only applied in the cross-process direction, the lateral edges (e.g., the edges 210 of the paper 202 and the edges 212 of the digital images 204 and 206) may be corrected. However, the leading and trail edges (e.g., the edges 216 of the paper 202 and the edges 214 of the digital images 204 and 206) may remain misaligned. In other words, applying image shear is not the same as simply rotating the image to correct the alignment between the digital image that is printed and the paper.

As discussed above, the image shear may be applied in the cross-process direction. In one embodiment, the image shear in the cross-process direction may shift a number of vertical scanlines in the skew direction by one pixel size. In one embodiment, the number of vertical scanlines may be based on the amount of skew. For example, if the amount of skew is detected by the sensor 108 to be 0.5 milliradians, every 2000 vertical scanline blocks may be shifted in the skew direction by one pixel. In one embodiment, the vertical scanlines may be shifted in a simple step pixel shift or may be shifted gradually.

Figure 3:
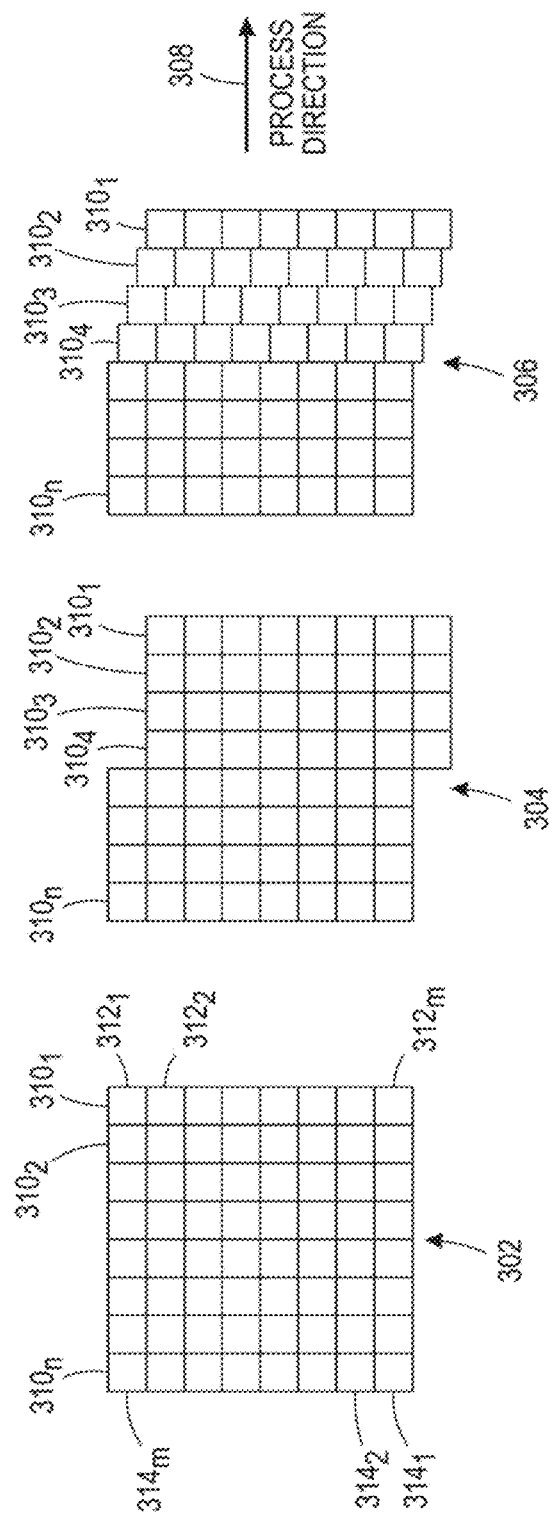
FIG. 3 illustrates a block diagram of image shear of the present disclosure.

FIG. 3 illustrates examples of the cross-process direction image shear. In FIG. 3, an original digital image 302 may have vertical scanlines $310_1$ to $310_n$ (also referred to herein individually as a vertical scanline 310 or collectively as vertical scanlines 310) and horizontal scanlines $314_1$ to $314_m$ (also referred to herein individually as a horizontal scanline 314 or collectively as horizontal scanlines 314). Each vertical scanline may be comprised of pixels $312_1$ to $312_m$ (also referred to herein individually as a pixel 312 or collectively as pixels 312).

It should be noted that FIG. 3 is intended to illustrate an original digital image 302 have any number of vertical scanlines 310, horizontal scanlines 314, and pixels 312. Thus, although it appears that the original image 302 is comprised of an 8×8 pixel block, it should be noted that it is not so limited. In addition, any numerical examples described herein may not be intended to necessarily reflect an 8×8 pixel block such as that illustrated in FIG. 3.

In one embodiment, a simple step pixel shift 304 may comprise shifting the number of vertical scanlines based on the amount of skew in a single step. For example, as illustrated in FIG. 3, the simple step pixel shift 304 may shift four vertical scanlines at a time by one pixel size. Thus, the vertical scanlines $310_1$ to $310_4$ may be shifted together in a single step.

In one embodiment, a gradual pixel shift 306 may include shifting the number of vertical scanlines gradually such that the image shear is less noticeable. For example, the vertical scanline $310_1$ may be shifted a by a full pixel size. The vertical scanline $310_2$ may be shifted by three fourths of a pixel size. The vertical scanline $310_3$ may be shifted by half of a pixel size. The vertical scanline $310_4$ may be shifted by a quarter of a pixel size, and so forth. In one embodiment, the amount of shift may be the size of the pixel 312 divided by a number of vertical scanlines that is shifted based on the amount of skew.

In one embodiment, whether the image shear module 116 applies the simple step pixel shift 304 or the gradual pixel shift 306 may be predetermined. In one embodiment, the type of pixel shift that is applied may be based on a printing resolution and a particular stage of digital image processing along the digital image path (e.g., halftone/binary image processing path or contone image path). For example, for high resolution printers the simple step pixel shift 304 may be applied and for low resolution printers the gradual pixel shift 306 may be applied. In addition, the simple step pixel shift 304 may be applied for either halftone or contone image processing, whereas the gradual pixel shift 306 may be applied only for contone printing.

The simple step pixel shift 304 may be faster and consume less memory and processing resources than the gradual pixel shift 306. However, the simple step pixel shift 304 may be more noticeable than the gradual pixel shift 306. The number of vertical scanlines that are shifted may be variable depending on the amount of skew that is detected by the sensor 108.

In one embodiment, the post shear module 118 may apply a missing jet process to the digital image after the image shear is applied in the cross-process direction. The missing jet process may be a process that is applied to some printing devices (e.g., ink jet printers) to compensate for missing jets.

For example, if an ink jet printer prints at 1000 dots per inch, the ink jet printer may have 1000 ink jets per inch that are responsible for dropping a dot of ink at each respective location along the cross-process direction. The ink jet printer may detect if an ink jet is not firing at a particular location (e.g., the ink jet may be clogged). For example, if the ink jet printer detects that ink jet number 97 in the cross-process direction is not firing, the ink jet printer may dispense additional ink via the adjacent ink jets (e.g., ink jet number 96 and 98) to compensate for the missing dot from the ink jet number 97.

However, if the missing jet process were to be applied to the digital image before the image shear was applied to the digital image, then the missing jet process may compensate at the wrong locations due to the shifting of the vertical scanlines 310, as described above. Thus, the present disclosure ensures that the image shear in the cross-process direction is applied before the missing jet process is applied.

In one embodiment, the post-shear module 118 may also apply image shear in the process direction. However, it should be noted that the image shear in the process direction may also be executed by the image shear module 116.

In one embodiment, the image shear in the process direction may be optional. In one embodiment, the image shear in the process direction may shift a number of horizontal scanlines 314 in the process direction to adjust for the image-paper registration error in the process direction. In other words, the image shear in the process direction may align the edges 214 of the digital images 204 and 206 to the edges 216 of the paper 202, illustrated in FIG. 2.

In one embodiment, the number of horizontal scanlines 314 that is shifted may be a function of the amount of skew. In one example, the function may comprise a resolution times a width of the paper times the amount of skew. For example, for 1 milliradian (1/1000 radians) at 1200 dots per inch resolution for a 14 inch wide paper, a total shift of about 17 pixels across the image width may be applied.

In one example, the image shear in the process direction may shift "blocks" of pixels 312. In one embodiment, the block size may be the inverse of the amount of skew. So using the example above of 1 milliradians, the inverse of 1/1000 radians would be 1000 pixels. As a result, we would need to shift every block of 1000 pixels by 1 pixel to achieve a total amount of shear of 17 pixels across the width of 14 inches in the process direction. Said another way, the image shear in the process direction may include a number of vertical scanlines in the cross-process direction and the number of horizontal scanlines in the process direction.

Referring back to FIG. 1, in one embodiment, the image shear module 116 and/or the post-shear module 118 may be activated if the amount of skew is greater than a predefined threshold. For example, some amount of skew may not be noticeable. In one example, the predefined threshold may be 0.1 milliradians of skew, 0.5 milliradians of skew, 1 milliradian of skew, and the like. The amount of skew detected by the sensor 108 may be compared to the predefined threshold. If the amount of skew is greater than the predefined threshold, then the processor 110 may execute the image shear module 116 and/or the post-shear module 118.

In one embodiment, the printing system 106 may include the printheads 120. The printheads 120 may be inkjet printheads, toner based imaging/development sub-systems, and the like. The printheads 120 may dispense any printing fluid to print the digital images 204 and 206 on the paper 202. In one embodiment, after the image shear is applied to the digital image, the processor 110 may control the printheads 120 in the printing system 106 to print the digital images 204 and 206 with the image shear applied onto the paper 202. As a result, the digital images 204 and 206 may be properly aligned with the paper 202 and the image-paper registration error may be removed or eliminated.

Thus, the printing device 100 of the present disclosure may correct the image-paper registration error by applying an image shear, rather than using a mechanical solution to adjust a position of the paper 202. The present disclosure may provide more efficient corrections for image-paper registration errors.

Figure 4:
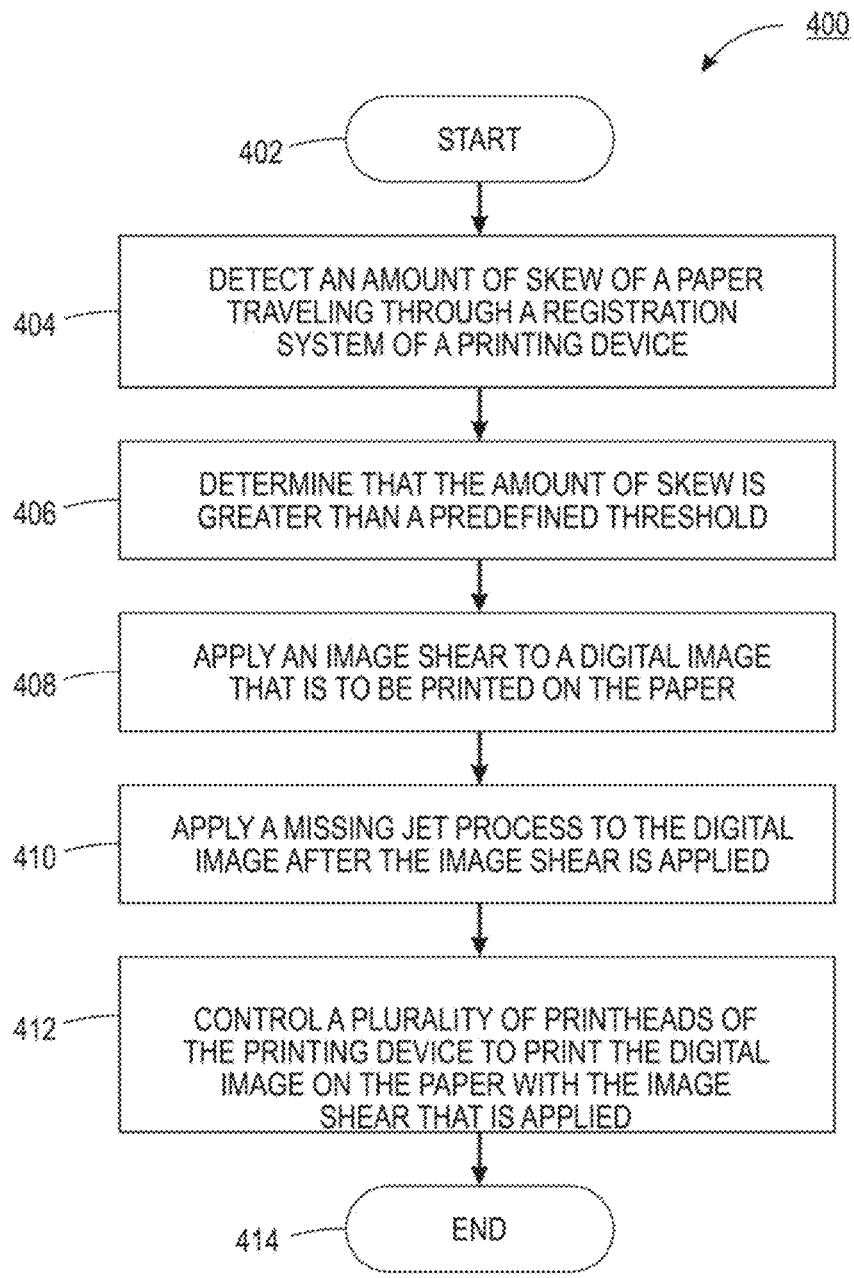
FIG. 4 illustrates a flowchart of an example method for applying an image shear to correct a digital image-paper registration error of the present disclosure.
Figure 5:
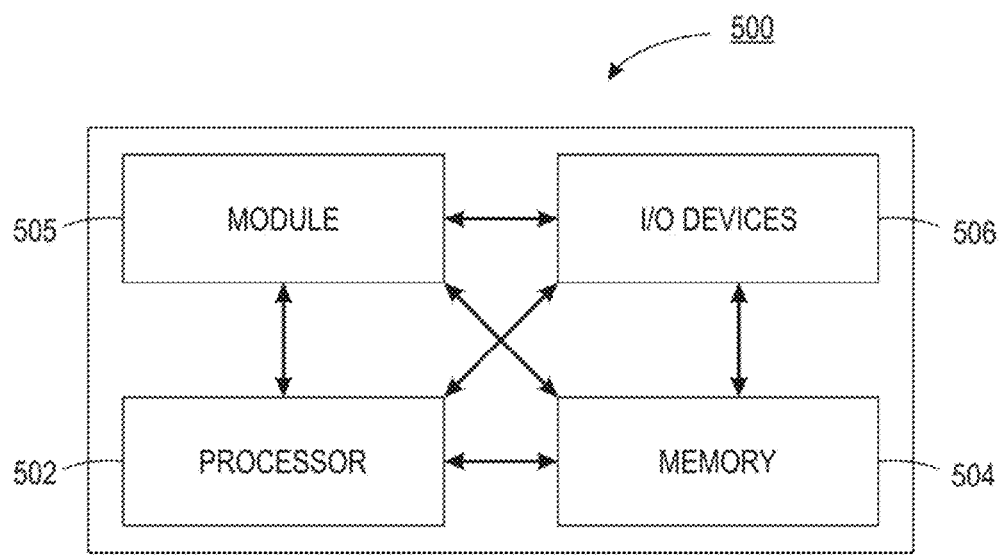
FIG. 5 illustrates a high-level block diagram of an example computer suitable for use in performing the functions described herein.

FIG. 4 illustrates a flowchart of an example method 400 for correcting an image-paper registration error. In one embodiment, one or more steps or operations of the method 400 may be performed by the printing device 100, or a computer/processor as illustrated in FIG. 5 and discussed below.

At block 402, the method 400 begins. At block 404, the method 400 detects an amount of skew of a paper traveling through a registration system of a printing device. In one embodiment, the amount of skew may be detected by a sensor in the registration system. For example the sensor may detect if both sides of a leading edge of the paper cross the sensor at the same time. If the opposite sides of the leading edge cross the sensor at different times, the sensor may calculate an amount of skew, in milliradians, based on the difference in time each side of the leading edge crossed the sensor.

At block 406, the method 400 determines that the amount of skew is greater than a predefined threshold. The amount of skew may be transmitted to a processor that can then compare the amount of skew to a predefined threshold. If the amount of skew is greater than or equal to the predefined threshold, an image shear may be applied to the digital image that is to be printed on the paper.

At block 408, the method 400 applies an image shear to a digital image that is to be printed on the paper. In one embodiment, the image shear may be applied in a cross-process direction, as described above. It should be noted that the image shear in the cross-process direction is applied before a missing jet process is applied, if applicable.

In one embodiment, the image shear may also be applied in a process direction, as described above. The image shear in the process direction may be applied before or after the missing jet process is applied, if applicable.

At optional block 410, the method 400 applies a missing jet process to the digital image after the image shear is applied. As discussed above, the missing jet process may compensate for ink jets that fail to fire in an ink jet printer. The missing jet process, if applied, may be applied only after the image shear in the cross-process direction is applied. As noted above, in some embodiments, the image shear in the process direction may be applied after the missing jet process is applied.

At block 412, the method 400 controls a plurality of printheads of the printing device to print the digital image on the paper with the image shear that is applied. For example, the printheads may dispense ink in accordance with the processed digital image with the image shear that is applied. As a result, the digital image may be printed such that at least the lateral edges of the digital image and the paper are aligned, or parallel.

In other words, if the image shear is not applied in the process direction, the leading edge and trail edge of the digital image may not be aligned, or parallel with, the leading edge and trail edge of the paper. Said another way, the image shear that is applied in the present disclosure is not simply rotating the digital image to align the digital image with the paper. At block 414, the method 400 ends.

It should be noted that the blocks in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 may comprise optional steps, or can be combined, separated, and/or performed in a different order from that described above, without departing from the example embodiments of the present disclosure.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for correcting an image-paper registration error, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware deployed on a hardware device, a computer or any other hardware equivalents (e.g., the printing device 100). For example, computer readable instructions pertaining to the method(s) discussed above can be used to configure a hardware processor to perform the steps, functions and/or operations of the above disclosed methods. In one embodiment, instructions and data for the present module or process 505 for correcting an image-paper registration error (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for correcting an image-paper registration error (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for correcting an image-paper registration error, comprising:
   detecting, by a processor, an amount of skew of a paper traveling through a registration system of a printing device;
   determining, by the processor, that the amount of skew is greater than a predefined threshold;
   applying, by the processor, an image shear to a digital image that is to be printed on the paper in response to the determining, wherein the image shear is to shift pixels of the digital image before printing to align the digital image with the paper and correct the amount of skew;
   applying, by the processor, a missing jet process to the digital image after the image shear is applied; and
   printing, via a plurality of printheads controlled by the processor, the digital image on the paper with the image shear that is applied.

2. The method of claim 1, wherein the image shear is applied in a cross-process direction.

3. The method of claim 2, wherein a number of vertical scanlines that the image shear is applied to is based on the amount of skew.

4. The method of claim 3, wherein the image shear is applied to the number of vertical scanlines in a simple step pixel shift.

5. The method of claim 3, wherein the image shear is applied to the number of vertical scanlines in a gradual pixel shift.

6. The method of claim 1, wherein the image shear is applied in a process direction.

7. The method of claim 6, wherein the image shear is applied to a number of horizontal scanlines calculated based on a function of the amount of skew.

8. The method of claim 7, wherein the function comprises a resolution of the digital image times a width of the digital image times the amount of skew.

9. The method off claim 1, wherein the image shear is applied in a cross-process direction and a process direction using a block of pixels.

10. A non-transitory computer-readable medium storing a plurality of instructions, which when executed by a processor, cause the processor to perform operations for correcting an image-paper registration error, the operations comprising:
    detecting an amount of skew of a paper traveling through a registration system of a printing device;
    determining that the amount of skew is greater than a predefined threshold;
    applying an image shear to a digital image that will be printed on the paper in response to the determining, wherein the image shear is to shift pixels of the digital image before printing to align the digital image with the paper and correct the amount of skew;
    applying, by the processor, a missing iet process to the digital image after the image shear is applied; and
    printing the digital image on the paper with the image shear that is applied.

11. The non-transitory computer-readable medium of claim 10,
    wherein the image shear is applied in a cross-process direction.

12. The non-transitory computer-readable medium of claim 11,
    wherein a number of vertical scanlines that the image shear is applied to is based on the amount of skew.

13. The non-transitory computer-readable medium of claim 12,
    wherein the image shear is applied to the number of vertical scanlines in a simple step pixel shift.

14. The non-transitory computer-readable medium of claim 12,
    wherein the image shear is applied to the number of vertical scanlines in a gradual pixel shift.

15. The non-transitory computer-readable medium of claim 10,
    wherein the image shear is applied in a process direction.

16. The non-transitory computer-readable medium of claim 14,
    wherein the image shear is applied to a number of horizontal scanlines calculated based on a function of the amount of skew.

17. The non-transitory computer-readable medium of claim 16,
    wherein the function comprises a resolution of the digital image times a width of the digital image times the amount of skew.

18. The non-transitory computer-readable medium of claim 10,
    wherein the image shear is applied in a cross-process direction and a process direction using a block of pixels.

* * * * *